United States Patent
Desai et al.

(10) Patent No.: US 10,877,849 B2
(45) Date of Patent: Dec. 29, 2020

(54) SYSTEM AND METHOD FOR MANAGING DIFFERENT TYPES OF SNAPSHOTS OF STORAGE OBJECTS

(71) Applicant: VMware, Inc., Palo Alto, CA (US)

(72) Inventors: Asit Desai, Cupertino, CA (US); Derek Uluski, Weymouth, MA (US); Alexander T. Garthwaite, South Hamilton, MA (US); Sunil Satnur, Cupertino, CA (US); Ilya Languev, Palo Alto, CA (US); Anoop Jaishankar, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 207 days.

(21) Appl. No.: 16/112,703

(22) Filed: Aug. 25, 2018

(65) Prior Publication Data
US 2020/0065196 A1    Feb. 27, 2020

(51) Int. Cl.
*G06F 11/14* (2006.01)
*G06F 9/455* (2018.01)
*G06F 16/11* (2019.01)
*G06F 16/22* (2019.01)

(52) U.S. Cl.
CPC ...... *G06F 11/1461* (2013.01); *G06F 9/45558* (2013.01); *G06F 16/128* (2019.01); *G06F 16/2246* (2019.01); *G06F 2009/45562* (2013.01)

(58) Field of Classification Search
CPC ............ G06F 11/1446; G06F 12/0253; G06F 11/1451; G06F 9/485; G06F 3/0608; G06F 16/134; G06F 16/10; G06F 3/1285; G06F 11/1448; G06F 3/0643; G06F 11/1461
See application file for complete search history.

(56) References Cited

U.S. PATENT DOCUMENTS

| | | | | |
|---|---|---|---|---|
| 7,831,639 | B1* | 11/2010 | Panchbudhe | G06F 16/10 707/816 |
| 8,291,261 | B2* | 10/2012 | Malleck | G06F 9/485 714/15 |
| 9,720,619 | B1* | 8/2017 | Shah | G06F 12/0253 |
| 2006/0282627 | A1* | 12/2006 | Aggarwal | G06F 3/0608 711/154 |
| 2016/0210302 | A1* | 7/2016 | Xia | G06F 3/1285 |
| 2017/0004048 | A1* | 1/2017 | Adkins | G06F 11/1448 |
| 2017/0123935 | A1* | 5/2017 | Pandit | G06F 11/1446 |
| 2018/0181584 | A1* | 6/2018 | Bestler | G06F 16/134 |
| 2019/0227878 | A1* | 7/2019 | Agarwal | G06F 11/1451 |
| 2019/0278482 | A1* | 9/2019 | Dubeyko | G06F 3/0643 |

\* cited by examiner

*Primary Examiner* — Etienne P Leroux
(74) *Attorney, Agent, or Firm* — Loza & Loza, LLP

(57) ABSTRACT

System and method for managing different types of snapshots of storage objects stored in a storage system uses a storage structure that includes both a storage object and any snapshots of the storage object. When a request to delete a snapshot of the storage object is received, a determination is made whether the snapshot is a first snapshot type. After determining that the snapshot is not the first snapshot type, the snapshot is deleted from the storage structure. After determining that the snapshot is the first snapshot type, the snapshot is marked as delete designated, and a deletion of the snapshot from the storage structure is prevented when there is a second snapshot type snapshot remaining in the storage structure that was created after the snapshot had been created so that the snapshot is available when the second snapshot type snapshot is subsequently used.

20 Claims, 12 Drawing Sheets

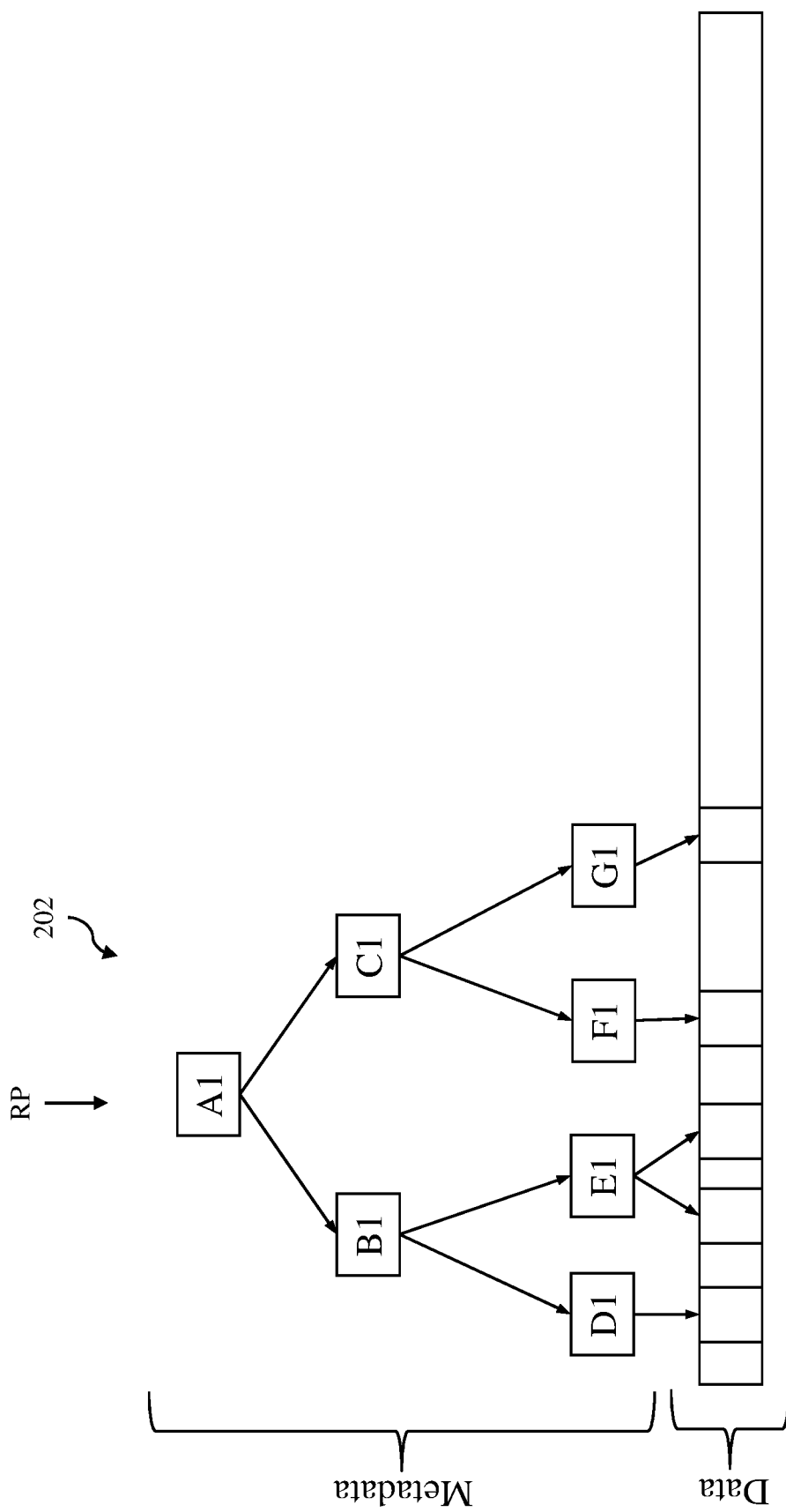

SYSTEM AND METHOD FOR MANAGING DIFFERENT TYPES OF SNAPSHOTS OF STORAGE OBJECTS

BACKGROUND

Snapshot technology is commonly used to preserve point-in-time (PIT) state and data of a virtual computing instance (VCI), such as a virtual machine. Snapshots of virtual computing instances are used for various applications, such as VCI replication, VCI rollback and data protection for backup and recovery.

Current snapshot technology can be classified into two types of snapshot techniques. The first type of snapshot techniques includes redo-log based snapshot techniques, which involve maintaining changes for each snapshot in separate redo logs. A concern with this approach is that the snapshot technique cannot be scaled to manage a large number of snapshots, for example, hundreds of snapshots. In addition, this approach requires intensive computations to consolidate across different snapshots.

The second type of snapshot techniques includes tree-based snapshot techniques, which involve creating a chain or series of snapshots to maintain changes to the underlying data using a B tree structure, such as a B+ tree structure. A significant advantage of the tree-based snapshot techniques over the redo-log based snapshot techniques is the scalability of the tree-based snapshot techniques. However, the snapshot structure of the tree-based snapshot techniques is intertwined and complex, especially when snapshot sizes and snapshot numbers are large. In addition, snapshots may be created and deleted by more than one entity, which further adds to the complexity of the snapshot structure. Thus, an important aspect of a snapshot system using a tree-based snapshot technique is managing the snapshots created by different entities.

BRIEF DESCRIPTION OF THE DRAWINGS

FIGS. 2A-2C illustrate a copy-on-write (COW) B+ tree structure for one storage object managed by a UPIT manager of the computer system in accordance with an embodiment of the invention.

Throughout the description, similar reference numbers may be used to identify similar elements.

DETAILED DESCRIPTION

Figure 1:
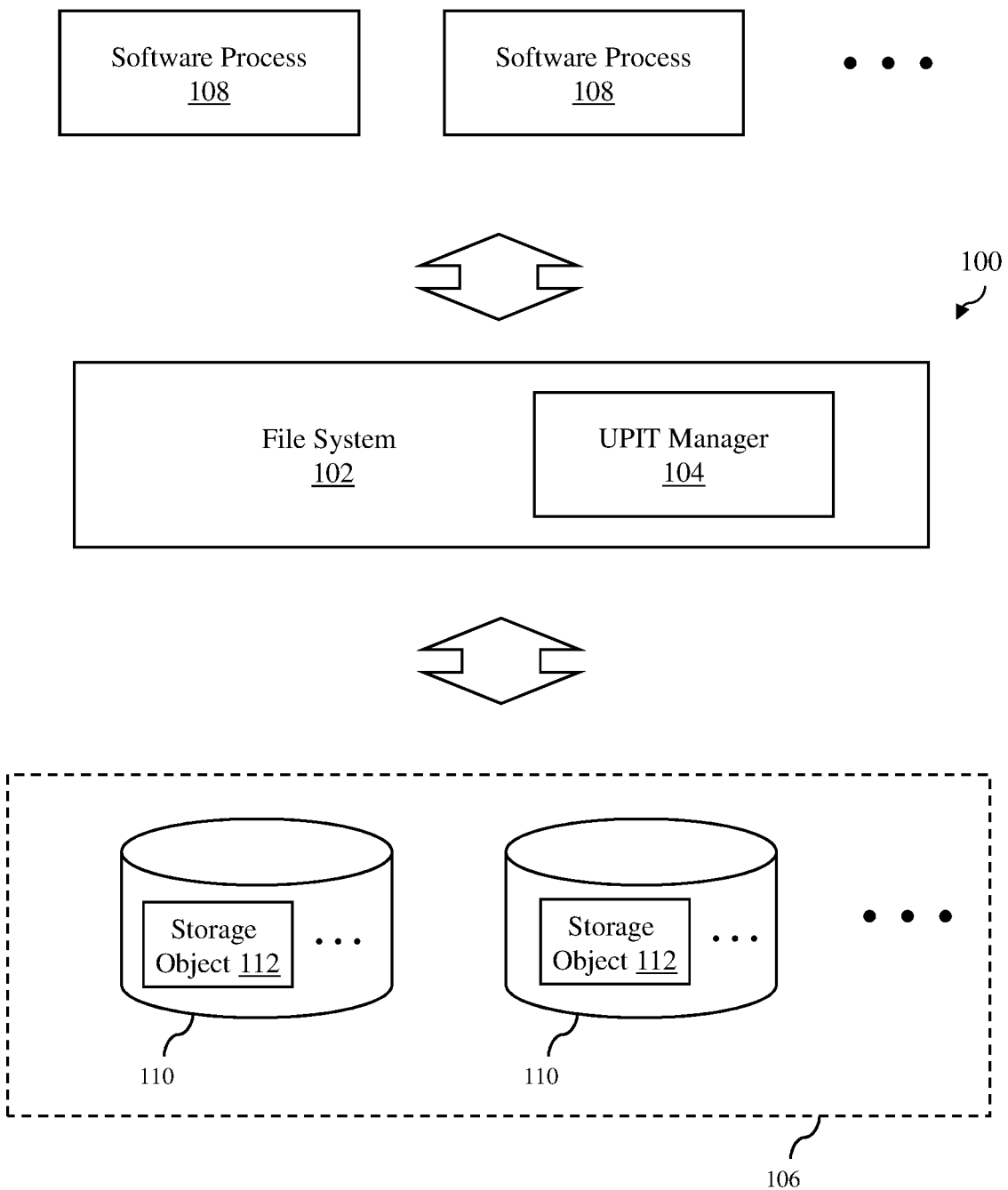
FIG. 1 is a block diagram of a computer system in accordance with an embodiment of the invention.

FIG. 1 depicts a computer system 100 in accordance with an embodiment of the invention. The computer system 100 is shown to include a file system 102 with a universal point-in-time (UPIT) manager 104 and a storage system 106. Other components of the computer system 100 that are commonly found in conventional computer systems, such as memory and processors, are not shown in FIG. 1. The computer system 100 allows software processes 108 to perform file system operations, such as creating/reading/writing/deleting data in the storage system 106, e.g., directories, folders, files and other storage objects, and to perform snapshot operations, such as creating/deleting snapshots of the data in the storage system 106. As described in detail below, the computer system 100 operates to manage snapshots of storage objects to ensure consistency and prevent data corruptions as snapshots of storage objects are created and deleted.

The software processes 108 can be any software program, applications or software routines that can run on one or more computers, which can be physical computers, virtual computers, such as VMware virtual machines, or distributed computer systems. The software processes 108 may initiate various data storage operations, such as read, write, delete and rename operations, for data stored in the storage system 106, which are then executed by the computer system 100. In addition, the software processes 108 may also initiate various snapshot operations, such as creating and deleting snapshots for data stored in the storage system 106.

The storage system 106 includes one or more computer data storage devices 110, which are used by the computer system 100 to store data, including metadata of storage objects 112 and actual data of the storage objects 112. The data storage devices can be any type of non-volatile storage devices that are commonly used for data storage. As an example, the data storage devices may be, but not limited to, solid-state devices (SSDs), hard disks or a combination of the two.

In an embodiment, the storage system 106 may be a local storage system of the computer system 100, such as hard drive disks in a physical server-grade computer. In another embodiment, the storage system 106 may be a distributed storage system such as a storage area network (SAN). In still another embodiment, the storage system 106 may be a collection of local storage systems of physical computers (not shown) in the computer system 100, such as hard drive disks in a personal computer system, which forms a virtual SAN. In still another embodiment, the storage system 106 may be a remote storage system that can be accessed via a network, such as a network-attached storage (NAS). Depending on the embodiment, the storage system 106 may include other components commonly found in those types of storage systems, such as network adapters, storage drivers and/or storage management servers. The storage system 106 may be scalable, and thus, the number of data storage devices 110 included in the storage system can be changed as needed to increase or decrease the capacity of the storage system to support increase/decrease in workload. Consequently, the exact number of data storage devices 110 included in the storage system 106 can vary from one to hundreds or more.

The storage system 106 may be used to store data in any logical storage units, such as file systems, files, groups of files, datastores, logical unit number (LUN) objects and virtual volumes (VVOLs). In addition, the storage system 106 may be used to store snapshots of any of these logical storage units or snapshots of applications using the data storage, such as virtual computing instances. As used herein, the term "virtual computing instance" is any software entity that can run on a computer system, such as a software application, a software process, a virtual machine and a "container" that provides system-level process isolation, such as a Docker container. Snapshots of virtual computing instances can be viewed as "images" of the virtual computer instances at the time when the snapshots were taken or created. As an example, a snapshot of a virtual machine is a copy of the non-volatile memory or virtual disk of the virtual machine, as well as the volatile memory of the virtual machine, at the time the snapshot was taken. A virtual machine snapshot may also include the configuration or settings of the virtual machine and the BIOS configuration at the time the snapshot was taken.

The file system 102 operates to manage file system operations to and from the software processes 108 and the storage system 106 for storage objects, such as file system volumes, file directories/folders, and files, for shared use of the storage system 106. Thus, the file system 102 organizes the storage resources of the storage system 106 into the file system structures so that the software processes 108 can access the storage objects for various storage operations, such as creating file system objects, deleting file system objects, writing or storing file system objects, reading or retrieving file system objects and renaming file system objects.

The UPIT manager 104 of the file system 102 operates to manage snapshots of storage objects stored in the storage system 106. The UPIT manager 104 manages the creation and deletion of snapshots of storage objects stored in the storage system. The UPIT manager 104 also supports various bookkeeping operations with respect to the snapshots, such as generating identifiers for the snapshots. As explained in more detail below, at least some storage objects and their snapshots are maintained in storage structures referred to herein as UPIT structures, which are stored in the storage system 106, such that each storage object and its snapshots are contained in a single storage structure. The UPIT manager 104 interacts with the UPIT structures to ensure snapshots are created and deleted in these UPIT structures.

Figure 2B:
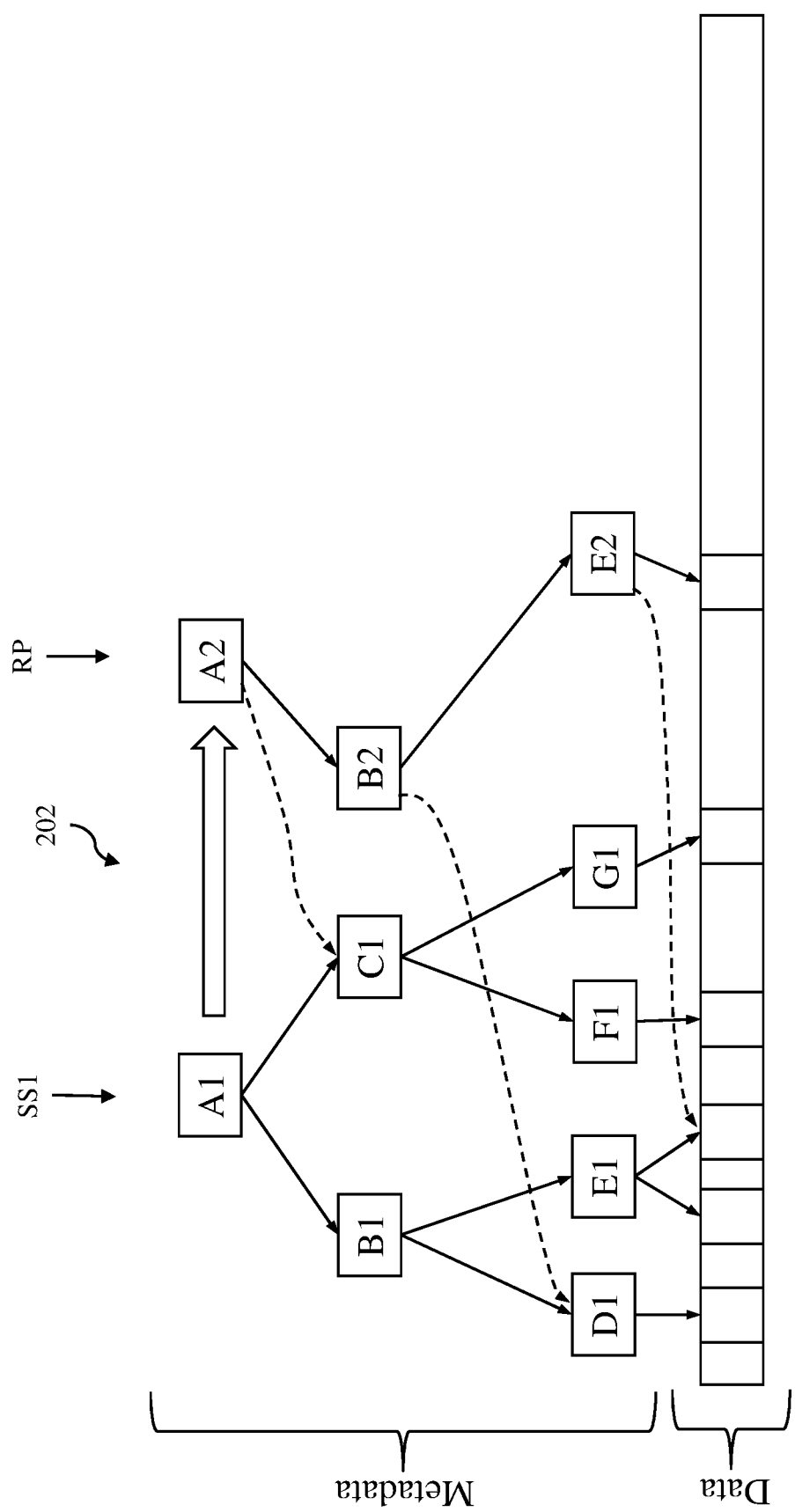
Figure 2C:
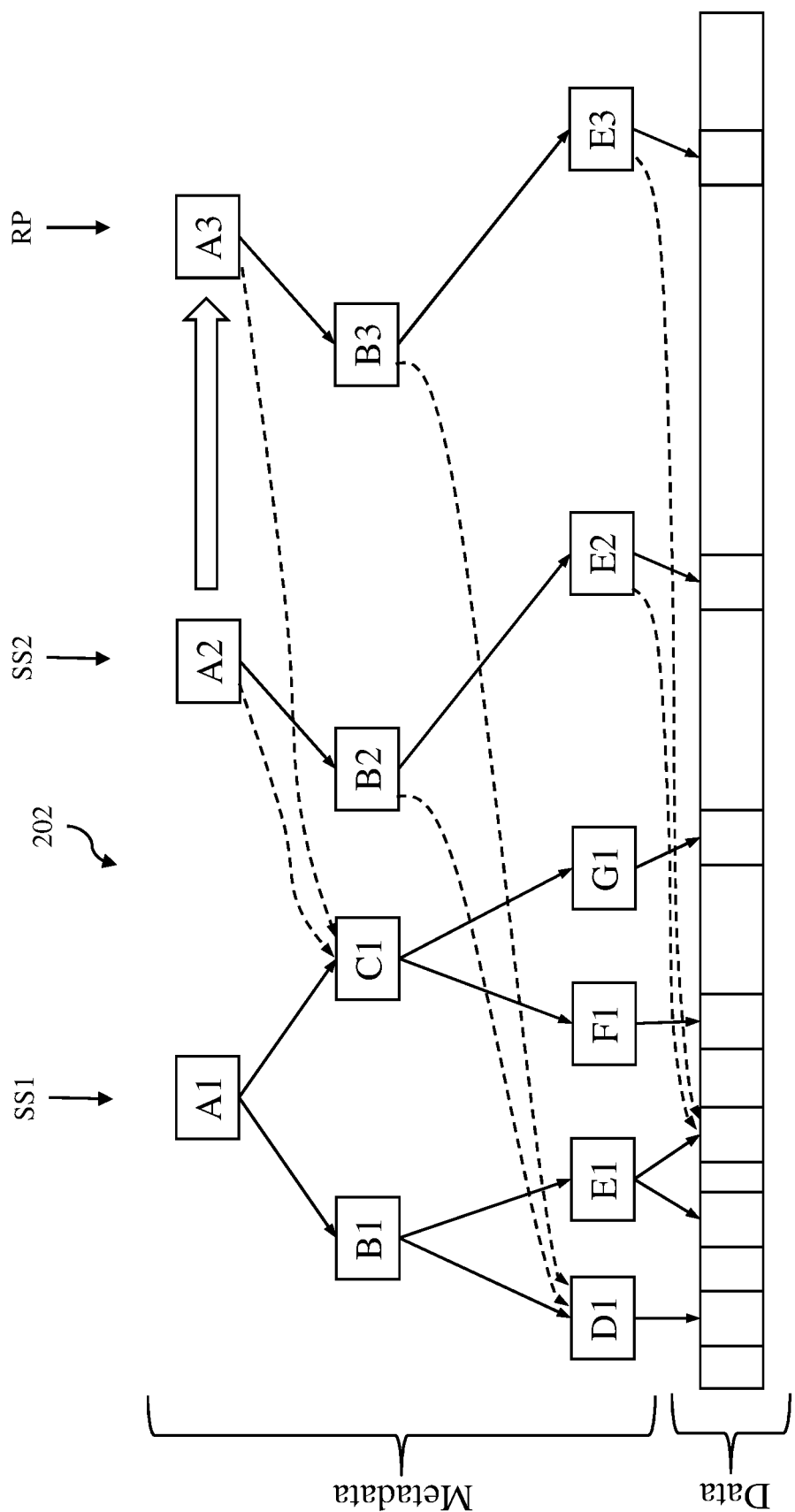

The UPIT manager 104 leverages B tree structures, such as copy-on-write (COW) B+ tree structures, to organize storage objects and their snapshots taken at different times. A COW B+ tree structure for one storage object managed by the UPIT manager 104 in accordance with an embodiment of the invention is illustrated in FIGS. 2A-2C. In this embodiment, the storage object includes data, which is the actual data of the storage object, and metadata, which is information regarding the COW B+ tree structure used to store the actual data in the storage system 106.

FIG. 2A shows the storage object before any snapshots of the storage object were taken. The storage object comprises data, which is stored in data blocks in the storage system 106, as defined by a B+ tree structure 202. Currently, the B+ tree structure 202 includes nodes A1-G1, which define one tree of the B+ tree structure (or one sub-tree if the entire B+ tree structure is viewed as being a single tree). The node A1 is the root node of the tree. The nodes B1 and C1 are index nodes of the tree. The nodes D1-G1 are leaf nodes of the tree, which are nodes on the bottom layer of the tree. As snapshots of the storage object are created, more root, index and leaf nodes, and thus, more trees may be created. Each root node contains references that point to index nodes. Each index node contains references that point to other index nodes. Each leaf node records the mapping from logic block address (LBA) to the physical location or address in the storage system. Each node in the B+ tree structure may include a node header and a number of references or entries. The node header may include information regarding that particular node, such as an identification (ID) of the node. Each entry in the leaf nodes may include an LBA, the entry type (e.g., private or shared), physical extent location, checksum and other characteristics of the data for this entry. In FIG. 2A, the nodes A1-G1 are modifiable. Thus, the tree with the nodes A1-G1 can be viewed as the current state or running point (RP) of the storage object.

FIG. 2B shows the storage object after a first snapshot SS1 of the storage object was taken. Once the first snapshot SS1 is created or taken, all the nodes in the B+ tree structure become immutable (i.e., cannot be modified). In FIG. 2B, the nodes A1-G1 have become immutable, preserving the storage object to a point in time when the first snapshot SS1 was taken. Thus, the tree with the nodes A1-G1 can be viewed as the first snapshot SS1. In an embodiment, the first snapshot of a storage object may include a snapshot generation identification, such as a number, and data regarding all the nodes in the B+ tree structure, e.g., the nodes A1-G1 in the example shown in FIG. 2B. When a modification of the storage object is made, after the first snapshot is created, a new root node and one or more index and leaf nodes are created. In FIG. 2B, new nodes A2, B2 and E2 have been created after the first snapshot SS1 was taken, which now define the running point of the storage object. Thus, the nodes A2, B2 and E2, as well as the nodes C1, D1, F1 and G1, which are common nodes for both the first snapshot SS1 and the current running point, represent the current state of the storage object.

FIG. 2C shows the storage object after a second snapshot SS2 of the storage object was taken. As noted above, once a snapshot is created or taken, all the nodes in the B+ tree structure become immutable. Thus, in FIG. 2C, the nodes A2, B2 and E2 have become immutable, preserving the storage object to a point in time when the second snapshot SS2 was taken. Thus, the tree with the nodes A2, B2, E2, C1, D1, F1 and G1 can be viewed as the second snapshot. In an embodiment, any snapshot of a storage object after the first snapshot include a snapshot generation identification, such as a number, and data regarding nodes in the B+ tree structure that differ from the previous snapshot of the storage object, e.g., the nodes A2, B2 and E2 in the example shown in FIG. 2C. When a modification of the storage object is made after the second snapshot SS2 is created, a new root node and one or more index and leaf nodes are created. In FIG. 2C, new nodes A3, B3 and E3 have been created after the second snapshot was taken. Thus, nodes A3, B3 and E3, as well as the nodes C1, D1, F1 and G1, which are common nodes for both the second snapshot and the current running point, represent the current state of the storage object.

Figure 3A:
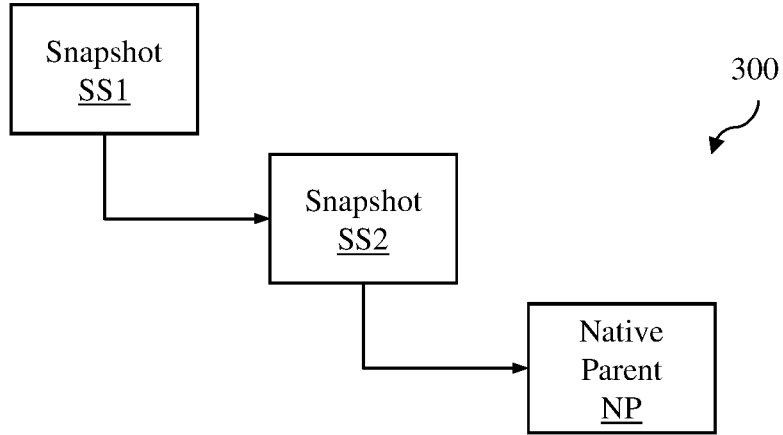
FIGS. 3A and 3B illustrate snapshot hierarchy and relationship in accordance with an embodiment of the invention.

In this manner, multiple snapshots of a storage object can be created at different times. These multiple snapshots create a hierarchy of snapshots. FIG. 3A illustrates a hierarchy 300 of snapshots for the example described above with respect to FIGS. 2A-2C. As shown in FIG. 3A, the hierarchy 300 includes a first snapshot SS1, a second snapshot SS2 and a native parent NP. The native parent NP is the current state of the storage object, which is the same as the running point for the storage object. Thus, the snapshot hierarchy 300 illustrates how snapshots of a storage object can be visualized.

Figure 3B:
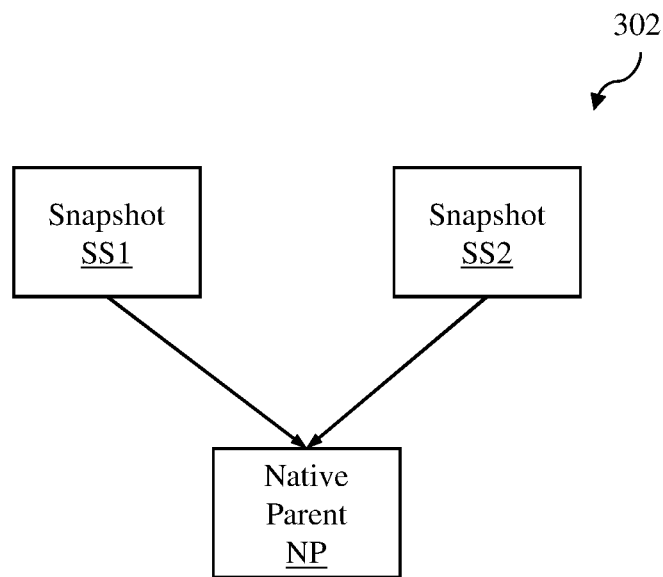

Each snapshot of a storage object can be viewed as a child of a native parent since each snapshot is a point-in-time representation of the native parent and is derived from the native parent. In an embodiment, all the snapshots of a storage object can be referenced by the storage object. Thus, the storage object can maintain a record of the snapshots of the storage object. This relationship 302 is illustrated in FIG. 3B, which shows that the first and second snapshots SS1 and SS2 are referenced by the native parent NP.

Unlike conventional snapshots of storage objects, which are maintained as separate storage objects, the file system 102 and the UPIT manager 104 use a single storage structure to store the native parent and all referenced snapshots for each storage object. Thus, all the information regarding all the snapshots of a storage object is contained in the single structure, which will be referred to herein as universal point-in-time (UPIT) structure. In an embodiment, the UPIT structure includes a directory of snapshots contained in the UPIT structure.

Figure 4:
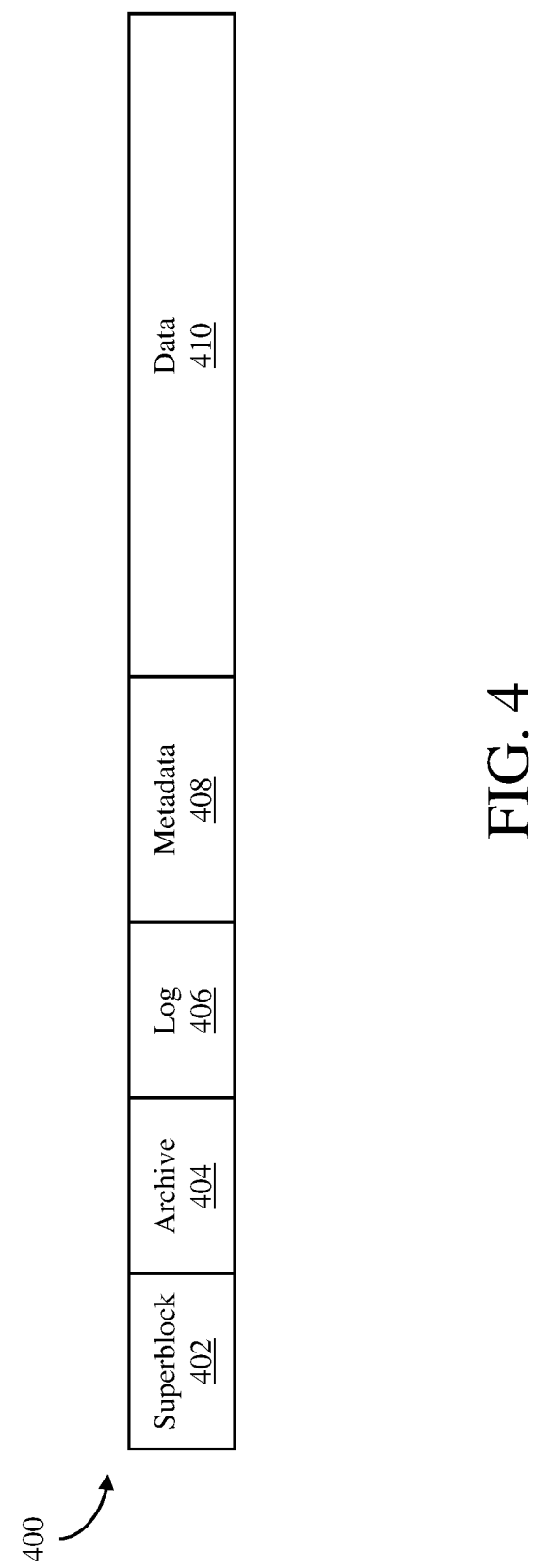
FIG. 4 is a block diagram of a universal point-in-time (UPIT) structure in accordance with an embodiment of the invention.

Turning now to FIG. 4, a UPIT structure 400 in accordance with an embodiment of the invention is shown. The UPIT structure 400 includes a superblock section 402, an archive section 404, a log section 406, a metadata section 408 and a data section 410. The superblock section includes information regarding checkpointing information. The archive section includes information regarding historical and current snapshots, such as creation and deletion of snapshots at different points in time. The log section includes logs of input/output (I/O) operations for the UPIT structure 400 (e.g., insert and delete data operations). The metadata section includes information regarding the nodes of the B+ tree structure being used to store the data. Thus, the metadata section includes all the nodes of the snapshots and the native parent, some of which are shared by the snapshots and the native parent. The data section includes the data being stored in the UPIT structure. Thus, the data section includes data for the snapshots and the native parent. In this embodiment, the UPIT structure is composed of a single file. However, in other embodiments, the UPIT structure may be composed of multiple files, where the first file of the UPIT structure will be similar to the UPIT structure 400 shown in FIG. 4, but other files of the UPIT structure may only include a metadata section and a data section.

The file system 102 and the UPIT manager 104 allow multiple software processes to create snapshots for a storage object in UPIT structures. Thus, a UPIT structure for a particular storage object may include some snapshots created by one software process and other snapshots created by another software process. For a storage object of a virtual machine, such as the namespace object (where descriptor files for the virtual machine are stored) and the virtual disk object (where a virtual disk of the virtual machine is stored), a virtualization software in a host computer supporting that virtual machine may create snapshots in the UPIT structure for that storage object in response to a user request (referred to herein as "managed snapshots") and a data protection module, running on any computer system, may create additional snapshots in the same UPIT structure (referred to herein as "unmanaged snapshots"). The unmanaged snapshots are automatically created by the data protection module as part of archival synchronizations of storage objects. The managed snapshots can be viewed as user-initiated snapshots of storage objects via virtualization software, for example, using VMware vSphere® product.

In the context of archival protection provided by a data protection module, if a managed snapshot is created between the time when the last archival sync took place and the current archival sync takes place, the data protection module needs to not only archive the data, but "replay" the act of creating that snapshot on the archival target in order to consistently be able to "replay" the snapshot hierarchy back upon recovery. Thus, the managed snapshots that are associated with archival instances that are saved must be retained or made available, even after the managed snapshots have been deleted. This is illustrated in FIG. 5.

Figure 5:
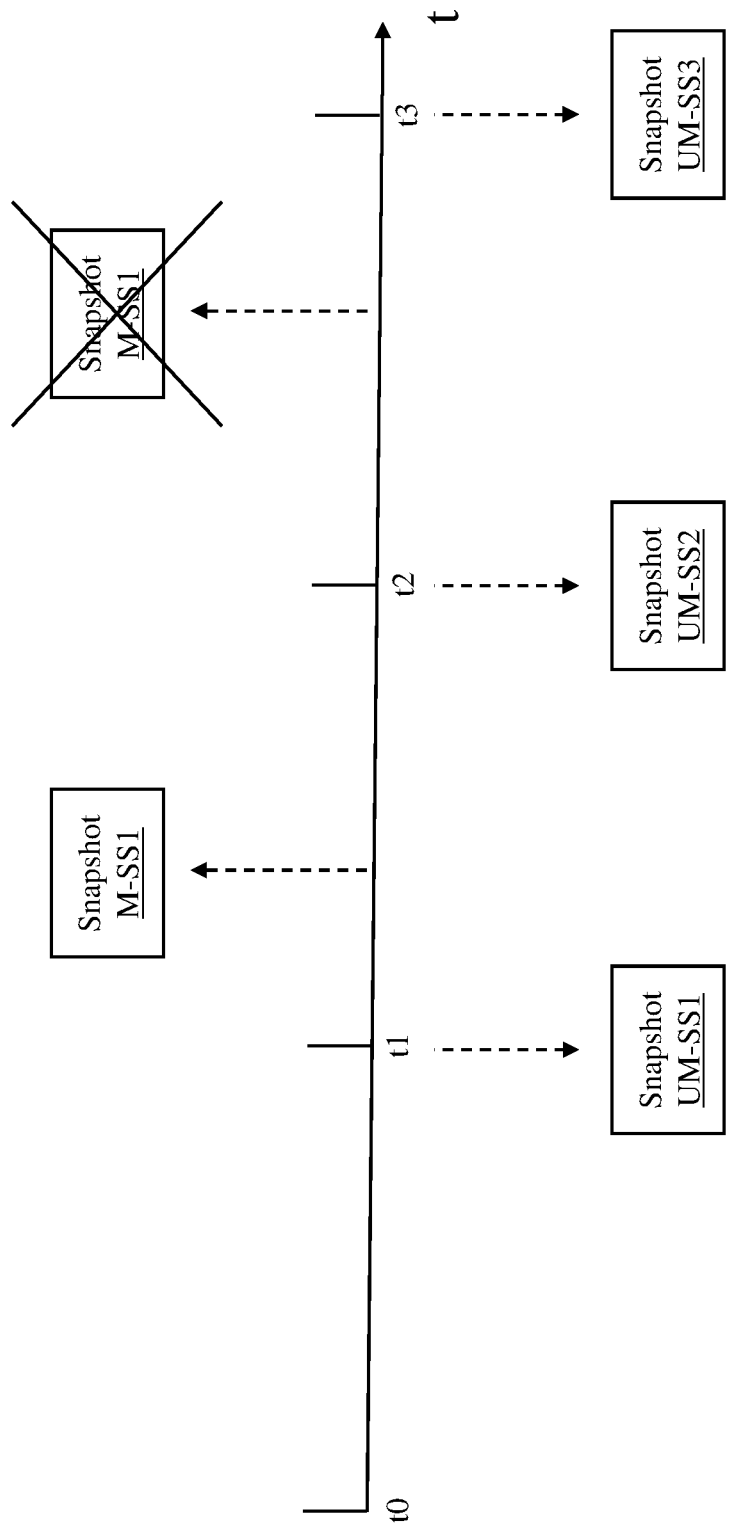
FIG. 5 shows a timeline of managed and unmanaged snapshots of a single storage object in a UPIT structure in accordance with an embodiment of the invention.

FIG. 5 shows a timeline of managed and unmanaged snapshots for a single storage object using a UPIT structure. At t=t0, a data protection module is enabled so that unmanaged snapshots can be taken at predefined intervals for archival protection. At t=t1, an unmanaged snapshot UM-SS1 is captured and archived, which is a copy of the storage object in the UPIT structure at the time of capture. Between t=t1 and t=t2, a managed snapshot M-SS1 is created by a user, for example, using a user interface to a virtualization software, which is stored in the UPIT structure. At t=t2, another unmanaged snapshot UM-SS2 is captured and archived. Since there is the managed snapshot M-SS1 for the storage object in the UPIT structure at t=t2, the unmanaged snapshot UM-SS2 will have a reference to the managed snapshot M-SS1. Between t=t2 and t=t3, the managed snapshot M-SS1 is deleted by the user. At t=t3, another unmanaged snapshot UM-SS3 is captured and archived. Since the managed snapshot M-SS1 for the storage object has already been deleted by the user at this moment in time, the unmanaged snapshot UM-SS3 will not have a reference to the managed snapshot M-SS1. However, if the managed snapshot M-SS1 was actually deleted from the UPIT structure when instructed by the user, the managed snapshot M-SS1 would not be available to recreate the object snapshot hierarchy at t=t2 if the storage object is to be recovered from the unmanaged snapshot UM-SS2 captured at t=t2. Another way to look at this issue is that, at t=t2, the state of the storage object was such that it had one managed snapshot, i.e., the managed snapshot M-SS1, so reverting the storage object back to when t=t2 should also include that managed snapshot. However, if that snapshot has been deleted, then it would not be possible to revert to the full state of the storage object at t=t2.

In order to ensure that managed snapshots of a storage object in a UPIT structure are available when needed, the UPIT manager 104 allows managed snapshots only to be deleted if the managed snapshot is not referenced by any existing unmanaged snapshots. Thus, if a request for deletion of a managed snapshot is received by the UPIT manager 104, the managed snapshot is marked as being delete designated, but not actually deleted if there are any unmanaged snapshots created after the creation of the managed snapshot and before the managed snapshot is delete designated. The UPIT manager 104 is able to keep track of the relative times of creation and deletion of managed and unmanaged snapshots in a UPIT structure to prevent managed snapshot from being actually deleted if the managed snapshots are referenced by unmanaged snapshots that have not been deleted. The reference of a managed snapshot by an unmanaged snapshot may be explicit (e.g., the unmanaged snapshot has a link to the record that is reference) or implicit (e.g., derived from looking for managed snapshots that satisfy the generation-number criteria).

Figure 6:
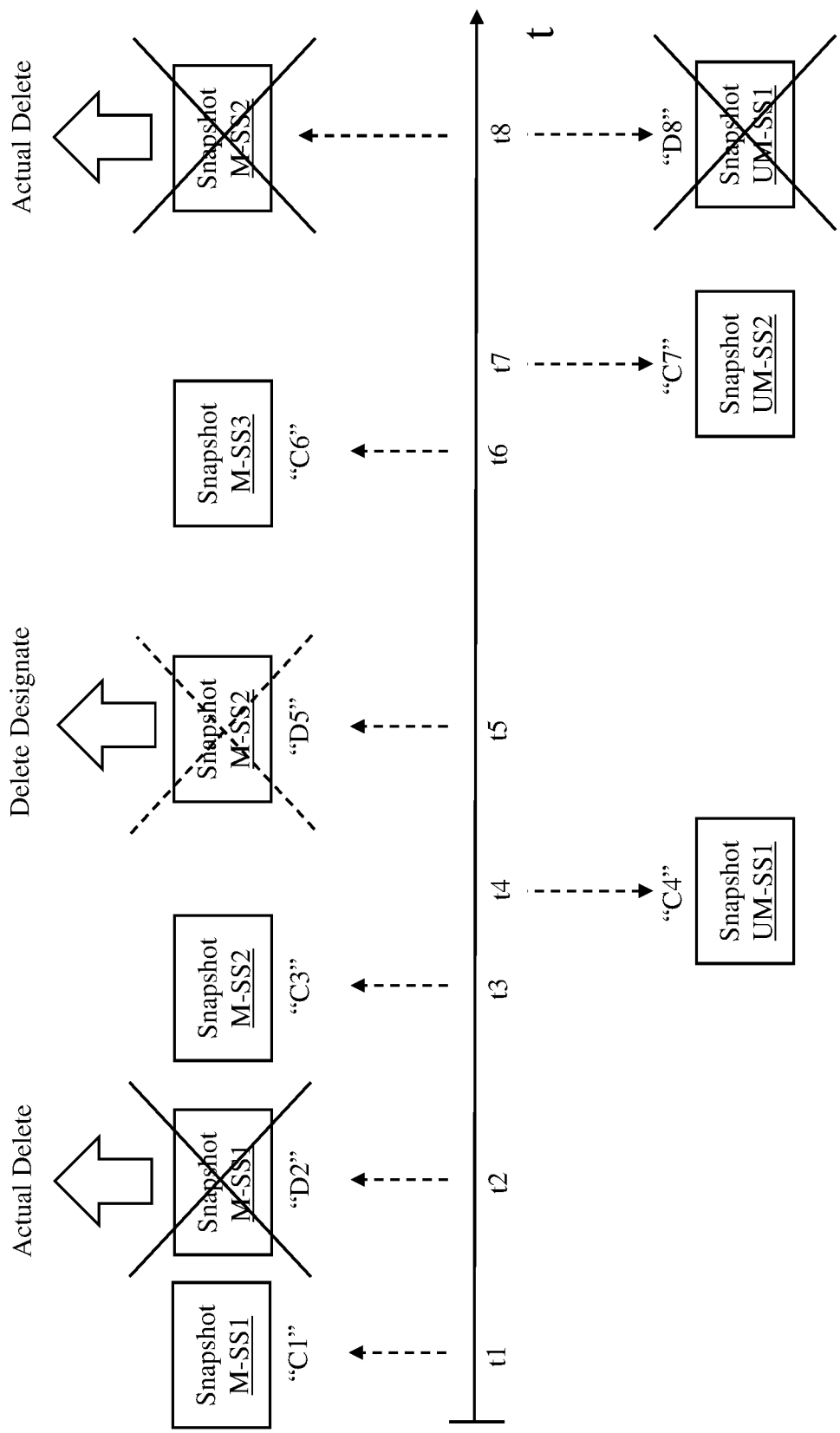
FIG. 6 shows a timeline of managed and unmanaged snapshots of a single storage object in a UPIT structure using creating and deletion information in accordance with an embodiment of the invention.

In an embodiment, for each snapshot of a storage object in a UPIT structure, at least three pieces of information can be maintained, which may be recorded in the UPIT structure. The first piece of information for each snapshot is snapshot creation information, which includes a creation identifier and a generation number. The second piece of information for each snapshot is whether the snapshot created is a managed snapshot of the storage object or an unmanaged snapshot of the storage object. As an example, this information can be implemented using a flag in the UPIT structure for each snapshot. The third piece of information for each snapshot is snapshot deletion information, which includes a deletion identifier and a generation number. The generation numbers are increased for each snapshot creation or for each snapshot deletion. By keeping track of relative timing information of creation and deletion of managed and unmanaged snapshots, the UPIT manager 104 is able to only delete managed snapshots when these managed snapshots are not needed by any unmanaged snapshots. In another embodiment, the information describe above may be organized per snapshot identifier. In this embodiment, the UPIT structure has a create-generation-number field and a delete-generation-number field with no separate identifiers. In some embodiments, the generation numbers are unique monotonic timestamps so that the creations and deletions are totally ordered with respect to each other. Thus, in these embodiments, any kind of values (including actual timestamps) can be used as long as the values have this property. In addition, these generation values are used for both the creations and deletions so that relative temporal positions of the creations and deletions can be readily determined by the generation values The use of creation and deletion information by the file system 102 is further described using an example illustrated in FIG. 6, which shows a timeline of managed and unmanaged snapshots for a single storage object in a UPIT structure.

At t=t1, a managed snapshot M-SS1 is created in response to a create request by a user. The creation of the managed snapshot M-SS1 will be recorded in the UPIT structure, e.g., in the archive section, using a snapshot identification for the snapshot with a managed snapshot identifier, a create identifier "C" and a generation number of "1". As an example, this managed snapshot may be a snapshot taken right before or right after a first update of the storage object in the UPIT structure.

At t=t2, the managed snapshot M-SS1 is marked as delete designated in response to a deletion request by the user. This delete designation of the managed snapshot M-SS1 is recorded in the UPIT structure, e.g., in the archive section, using the snapshot identification for the snapshot with a delete identifier "D" and a generation number of "2". Since no unmanaged snapshot was created after the managed snapshot M-SS1 was created and before the snapshot M-SS1 was marked as delete designated, the managed snapshot M-SS1 is actually deleted from the UPIT structure by the UPIT manager 104.

At t=t3, another managed snapshot M-SS2 is created in response to a create request by a user. The creation of the managed snapshot M-SS2 is recorded in the UPIT structure, e.g., in the archive section, using a snapshot identification for the snapshot with a managed snapshot identifier, a create identifier "C" and a generation number of "3". As an example, this managed snapshot may be a snapshot taken right before or right after a patch for the first update of the storage object.

At t=t4, an unmanaged snapshot UM-SS1 is created by the data protection module. The creation of the unmanaged snapshot UM-SS1 is recorded in the UPIT structure, e.g., in the archive section, using a snapshot identification for the snapshot with an unmanaged snapshot identifier, a create identifier "C" and a generation number of "4". In an embodiment, since the managed snapshot M-SS2 exists at t=t4, a reference to the managed snapshot M-SS2 is recorded for the unmanaged snapshot UM-SS1, for example, in the UPIT structure, e.g., in the archive section. Thus, in this embodiment, the managed snapshot M-SS2 is associated with the unmanaged snapshot UM-SS1 in the UPIT structure.

At t=t5, the managed snapshot M-SS2 is marked as delete designated in response to a deletion request by the user. This delete designation of the managed snapshot M-SS2 is recorded in the UPIT structure, e.g., in the archive section, using the snapshot identification for the snapshot with a delete identifier "D" and a generation number of "5". Since the unmanaged snapshot UM-SS1, which was created after the managed snapshot M-SS2 was created and before the snapshot M-SS2 was marked as delete designated, has not yet been deleted, the managed snapshot M-SS2 is not deleted from the UPIT structure by the UPIT manager 104 so that the managed snapshot M-SS2 is available for the unmanaged snapshot UM-SS1. In other words, since there is an unmanaged snapshot, i.e., the unmanaged snapshot UM-SS1, with a generation number greater than the create generation number of the managed snapshot being deleted, i.e., the managed snapshot M-SS2, and less than the delete generation number of the managed snapshot being deleted, that managed snapshot should be marked as delete designated, but not actually deleted. The managed snapshot M-SS2 is not deleted so that the managed snapshot M-SS2 is available if the storage object is recovered using the unmanaged snapshot UM-SS1, which was created at t=t4 when the managed snapshot M-SS2 existed for the storage object.

At t=t6, another managed snapshot M-SS3 is created in response to a create request by the user. The creation of the managed snapshot M-SS3 is recorded in the UPIT structure, e.g., in the archive section, using a snapshot identification for the snapshot with a managed snapshot identifier, a create identifier "C" and a generation number of "6". As an example, this managed snapshot may be a snapshot taken right before or right after a second update of the storage object.

At t=t7, another unmanaged snapshot UM-SS2 is created by the data protection module. The creation of the unmanaged snapshot UM-SS2 is recorded in the UPIT structure, e.g., in the archive section, using a snapshot identification for the snapshot with an unmanaged snapshot identifier, a create identifier "C" and a generation number of "7".

At t=t8, the unmanaged snapshot UM-SS1 is deleted by the data protection module. This deletion of the unmanaged snapshot UM-SS1 is recorded in the UPIT structure, e.g., in the archive section, using the snapshot identification for the snapshot with a delete identifier "D" and a generation number of "7". With the deletion of the unmanaged snapshot UM-SS1, the "delete designated" managed snapshot M-SS2 that was referenced by the unmanaged snapshot UM-SS1 is now actually deleted from the UPIT structure by the UPIT manager 104.

Figure 7:
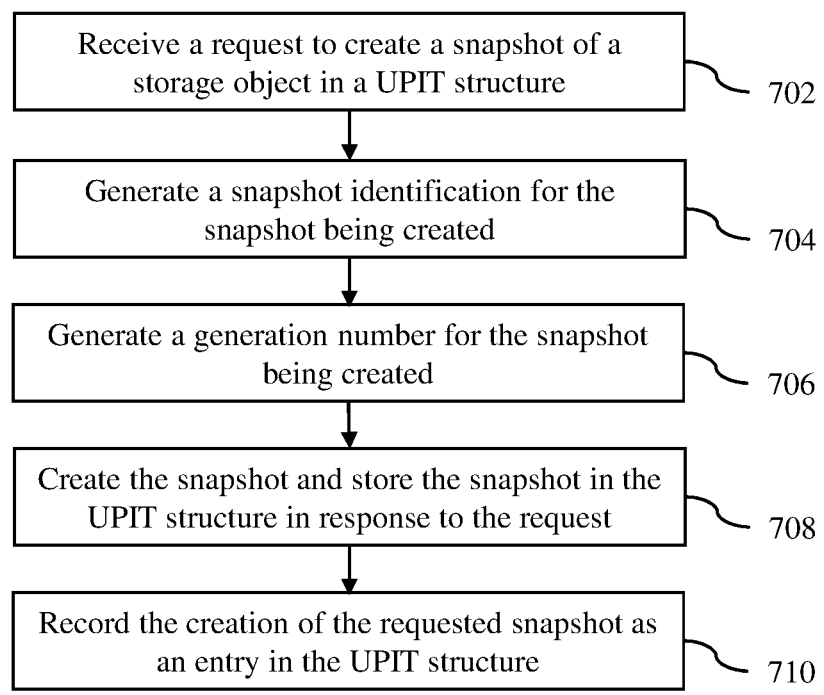
FIG. 7 is a flow diagram of an operation of the UPIT manager with respect to a create request of a snapshot for a storage object in a UPIT structure in accordance with an embodiment of the invention.

The operation of the UPIT manager 104 with respect to a create request of a snapshot for a storage object in a UPIT structure in accordance with an embodiment of the invention will now be described with reference to the flow diagram of FIG. 7. At block 702, a request to create a snapshot of a storage object is received at the file system 102 from a requesting entity. As an example, the request may be from a virtualization software running on a host computer that is hosting a virtual machine or from a data protection module running on one or more computers. In this example, the storage object may be data that supports the virtual machine, such as a virtual disk object.

At block 704, a snapshot identification for the snapshot being created is generated by the UPIT manager. At block 706, a generation number for the snapshot being created is generated by the UPIT manager 104. The generation number is unique to each snapshot creation or deletion operation. In an embodiment, the generation number that is generated is a number increased from the generation number of the last creation or deletion operation performed by the UPIT manager 104. Again, the generation numbers may be unique monotonic timestamps so that snapshot creations and deletions are ordered with respect to each other. In addition, any kind of values (including actual timestamps) can be used as long as the values have this property.

At block 708, in response to the request, the requested snapshot of the storage object is created and stored in the UPIT structure by the UPIT manager 104. Next, at block 710, the creation of the requested snapshot is recorded as an entry in the UPIT structure by the UPIT manager 104. The entry includes the snapshot identification for the snapshot, the type of snapshot, i.e., a managed or unmanaged snapshot, an operation type for this entry, e.g., snapshot creation or deletion, and the generation number for the snapshot. If the snapshot is being created via a virtualization software, the entry would include the snapshot identification for the created snapshot, an indication of the type of snapshot being created [e.g., that the snapshot is a managed or an unmanaged snapshot], an indication that the operation is a snapshot creation and the generation number for the created snapshot. In embodiment, the entry for the created snapshot is recorded in the archive section of the UPIT structure by the UPIT manager 104. The process then comes to an end. This process for creating a snapshot of a storage object is similar regardless of whether the snapshot created is a managed snapshot or an unmanaged snapshot, except for the indication of the type of snapshot that was created.

Figure 8:
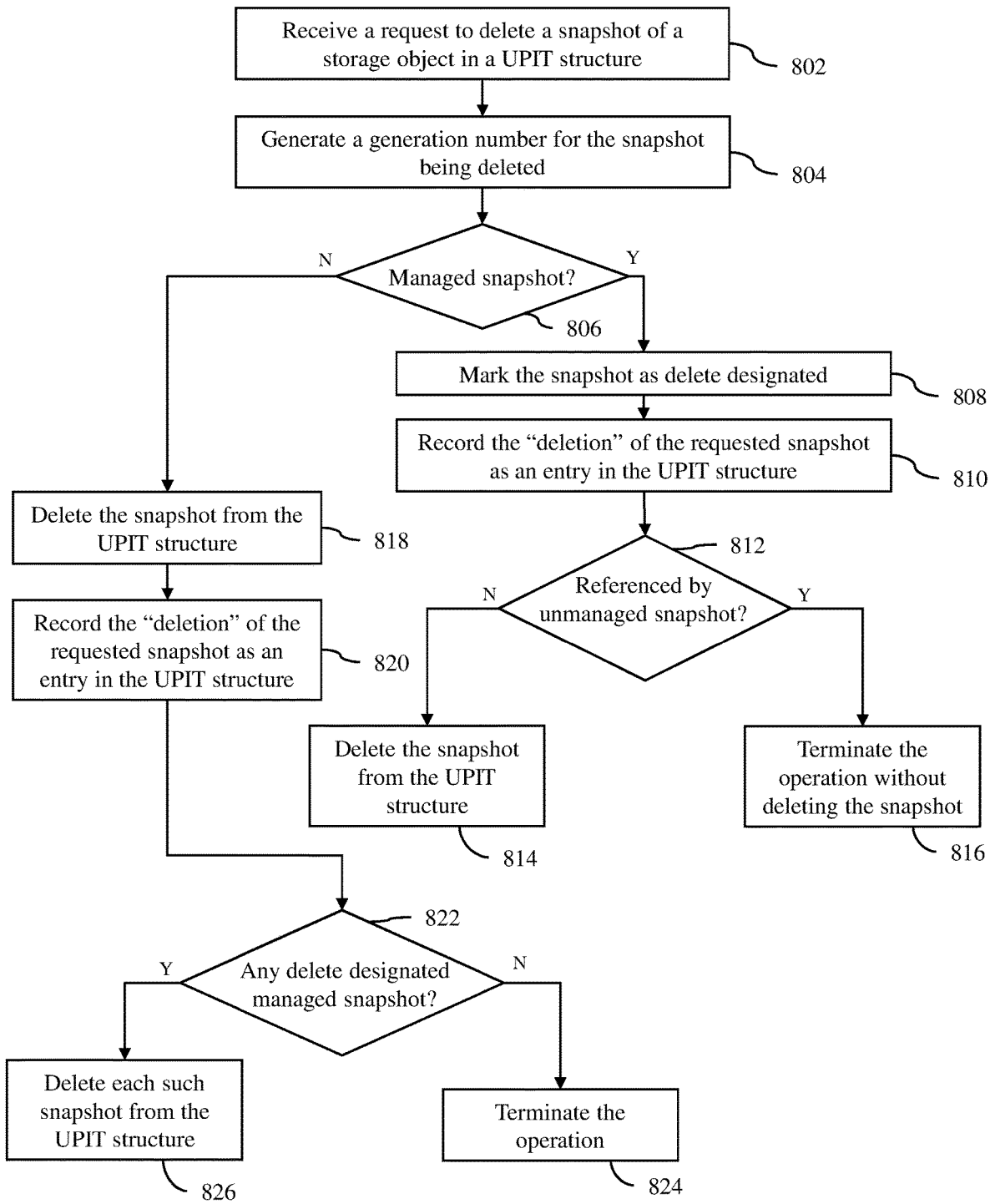
FIG. 8 is a flow diagram of an operation of the UPIT manager with respect to a delete request of a snapshot for a storage object in a UPIT structure in accordance with an embodiment of the invention

The operation of the UPIT manager 104 with respect to a delete request of a snapshot for a storage object in a UPIT structure in accordance with an embodiment of the invention will now be described with reference to the flow diagram of FIG. 8. At block 802, a request to delete a snapshot of a storage object in a UPIT structure is received at the file system 102 from a requesting entity. The delete request includes at least the snapshot identification of the snapshot to be deleted. As an example, the request may be from a virtualization software running on a host computer that is hosting a virtual machine or from a data protection module running on one or more computers. In this example, the storage object may be data that supports the virtual machine, such as a virtual disk object.

At block 804, a generation number for the snapshot being deleted is generated by the UPIT manager 104. At block 806, a determination is made whether the requested snapshot is a managed snapshot by the UPIT manager 104. In an embodiment, this determination is made by reading the create entry for the requested snapshot, which includes an indication of the snapshot type. If the requested snapshot is a managed snapshot, the process proceeds to block 808, where the requested snapshot is marked as delete designated without actually deleting the requested snapshot by the UPIT manager 104.

Next, at block 810, the "deletion" of the requested snapshot is recorded as an entry in the UPIT structure by the UPIT manager 104. The entry includes the snapshot identification for the "deleted" snapshot, an operation type for this entry, i.e., snapshot deletion, and the generation number for the deleted snapshot. In embodiment, the entry for the deleted snapshot is recorded in the archive section of the UPIT structure.

At block 812, a determination is made by the UPIT manager 104 whether the snapshot is referenced by an unmanaged snapshot in the UPIT structure (i.e., not yet deleted) that was created after the deleted snapshot. If the snapshot is not referenced by an unmanaged snapshot, then the process proceeds to block 814, where the snapshot is actually deleted from the UPIT structure by the UPIT manager. The process then comes to end. However, if the snapshot is referenced by an unmanaged snapshot, then the process is terminated without actually deleting the snapshot from the UPIT structure by the UPIT manager 104, at block 816.

Turning back to block 806, if the requested snapshot is not a managed snapshot, the process proceeds to block 818, where the requested snapshot is deleted from the UPIT structure by the UPIT manager 104. Next, at block 820, the deletion of the requested snapshot is recorded as an entry in the UPIT structure by the UPIT manager 104. The entry includes the snapshot identification for the deleted snapshot, an operation type for this entry, i.e., snapshot deletion, and the generation number for the deleted snapshot. In embodiment, the entry for the deleted snapshot is recorded in the archive section of the UPIT structure. The entry for an actually deleted snapshot and the entry for a delete designated snapshot may be identical except for the generation number.

Next, at block 822, a determination is made by the UPIT manager 104 whether any delete designated managed snapshot exists in the UPIT structure associated only with the now-deleted unmanaged snapshot and no subsequent unmanaged snapshot. If there is no such managed snapshot, then the operation is terminated, at block 824. However, if there is any such unmanaged snapshot, then the process proceeds to block 826, where each such delete designated managed snapshot is actually deleted from the UPIT structure by the UPIT manager 104. The process then comes to an end.

In some embodiments, creation of some managed snapshots of a storage object may be initiated by a data protection module running on one or more computers. As an example, a data protection module may be configured or programmed to create application consistent snapshots of a virtual machine for possible recovery, which requires application quiesced state for the virtual machine when the data protection snapshot is captured. In this example, the data protection module may take advantage of a managed snapshot feature that quiesces the virtual machine before a managed snapshot is taken. By initiating such a managed snapshot, the data protection module can then take an application quiesced unmanaged snapshot. The data protection module will then delete the managed snapshot so that the user does not see the managed snapshot initiated by the data protection module on a user interface. These application quiesced managed and unmanaged snapshots can be created and deleted in the same manner as described above with respect to FIGS. 7 and 8. Thus, the managed snapshot initiated by the data protection module will only be actually deleted when the associated unmanaged snapshot is deleted. In an alternative embodiment, the UPIT manager 104 may identify these managed snapshots initiated by the data protection module and actually delete these managed snapshots when they are deleted by the data protection module after application quiesced unmanaged snapshots have been created.

Figure 9:
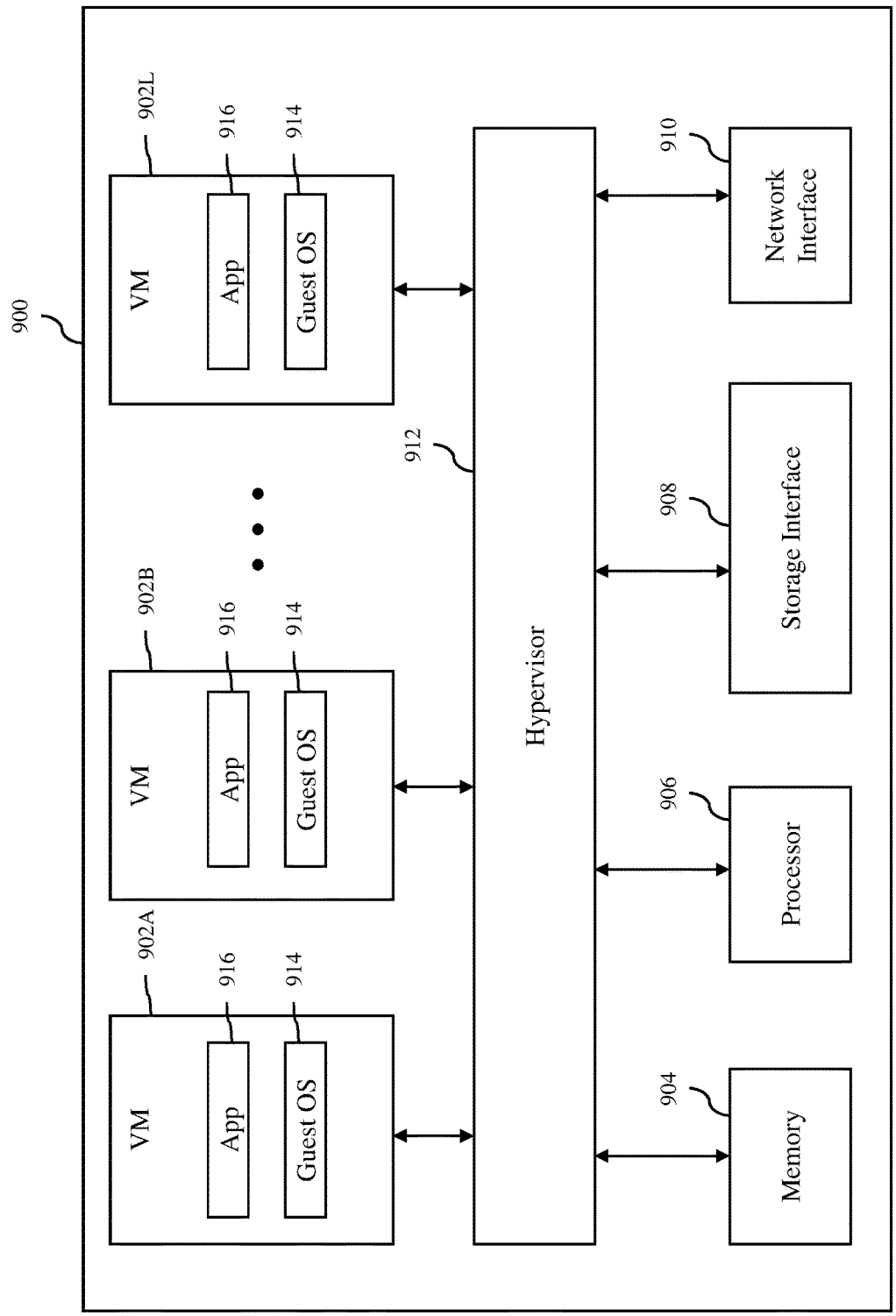
FIG. 9 is a block diagram of a physical computer system with a number of virtual machines in which the file system in accordance with an embodiment of the invention may be implemented.

The file system 102 may be implemented as part of an operating system (OS) of a computer system, which may be a physical computer system, such as a physical server, or a virtual computer system, such as a virtual machine. Turning now to FIG. 9, a physical computer system 900 in which the file system 102 may be implemented is shown. In FIG. 9, the physical connections between the various components of the computer system are not illustrated. As shown in FIG. 9, the physical computer system is configured to support a number of virtual machines (VMs) 902A, 902B . . . 902L (where L is a positive integer). The number of VMs supported by the physical computer system can be anywhere from one to more than one hundred. The exact number of VMs supported by the physical computer system is only limited by the physical resources of the physical computer system. The VMs share at least some of the hardware resources of the physical computer system, which include one or more system memories 904, one or more processors 906, a storage interface 908, and a network interface 910. Each system memory, which may be random access memory (RAM), is the volatile memory of the physical computer system. Each processor can be any type of a processor, such as a central processing unit (CPU) commonly found in a personal computer. The storage interface is an interface that allows that physical computer system to communicate with one or more physical storage systems. As an example, the storage interface may be a host bus adapter or a network file system interface. The network interface is an interface that allows the physical computer system to communicate with other devices through one or more computer networks. As an example, the network interface may be a network adapter.

In the illustrated embodiment, the VMs 902A, 902B . . . 902L run on "top" of a hypervisor 912, which is a software interface layer that, using virtualization technology, enables sharing of the hardware resources of the physical computer system 900 by the VMs. However, in other embodiments, one or more of the VMs can be nested, i.e., a VM running in another VM. Any computer virtualization architecture can be implemented. For example, the hypervisor may run on top of the physical computer system's operating system or directly on hardware of the physical computer system. With the support of the hypervisor, the VMs provide isolated execution spaces for guest software. Each VM may include a guest operating system 914, one or more guest applications 916. The guest operating system manages virtual system resources made available to the corresponding VM by the hypervisor, and, among other things, the guest operating system forms a software platform on top of which the guest applications run.

The file system 102 may be implemented in one or more VMs 902A, 902B . . . 902L running in the physical computer system 900 as part of their OS, i.e., the guest OS 914. Thus, in this implementation, the file system 102 allows guest applications 916 to access physical storage systems available to the physical computer system. The file system 102 may also be implemented in the physical computer system as part of the host OS. Thus, the file system 102 may be implemented in the OS of any physical or virtual computer system. In other embodiments, the file system 102 may be implemented as a distributed file system, where agents of the file system are installed in multiple physical or virtual computer systems.

Figure 10:
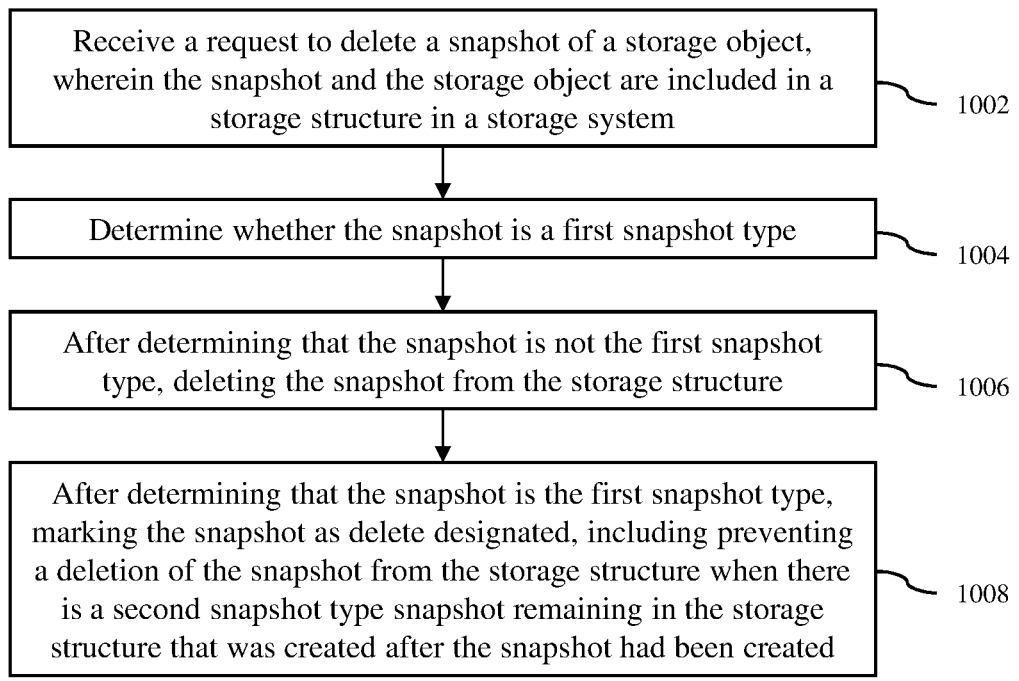
FIG. 10 is a flow diagram of a method for managing different types of snapshots of storage objects stored in a storage system in accordance with an embodiment of the invention.

A method for managing different types of snapshots of storage objects stored in a storage system in accordance with an embodiment of the invention is described with reference to a flow diagram of FIG. 10. At block 1002, a request to delete a snapshot of a storage object is received at a file system of a computer system. The snapshot and the storage object are included in a storage structure in the storage system. At block 1004, a determination is made whether the snapshot is a first snapshot type, e.g., a managed snapshot of the storage object, by the file system. At block 1006, after determining that the snapshot is not the first snapshot type, the snapshot is deleted from the storage structure by the file system. At block 1008, after determining that the snapshot is the first snapshot type, the snapshot is marked as delete designated by the file system. In addition, a deletion of the snapshot from the storage structure is prevented by the file system when there is a second snapshot type snapshot remaining in the storage structure that was created after the snapshot had been created so that the snapshot is available when the second snapshot type snapshot is subsequently used, for example, for recover of the storage object.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing different types of snapshots of storage objects stored in a storage system, the method comprising:
   receiving a request to delete a snapshot of a storage object, wherein the snapshot and the storage object are included in a storage structure in the storage system;
   determining whether the snapshot is a first snapshot type or a second snapshot type, wherein a snapshot of the first snapshot type is a snapshot that is created in response to a user request and wherein a snapshot of the second snapshot type is a snapshot that is automatically created; and
   when the snapshot is determined to be the second snapshot type, deleting the snapshot from the storage structure, and when the snapshot is determined to be the first snapshot type, marking the snapshot as delete designated without deleting the snapshot from the storage structure only if there is another snapshot of the second snapshot type in the storage structure and the another snapshot was created after the snapshot had been created in the storage structure, thereby the snapshot being available when the second snapshot type snapshot is subsequently used.

2. The method of claim 1, wherein the first snapshot type is a type of snapshot created by a virtualization software supporting a virtual computing instance and wherein the second snapshot type snapshot is a snapshot created by a data protection module for recovery of the storage object.

3. The method of claim 1, wherein the storage object and the snapshot are both stored in the storage structure using a B+ tree structure.

4. The method of claim 1, further comprising, when the snapshot is determined to be the first snapshot type, marking the snapshot as delete designated, recording a deletion of the snapshot as an entry in the storage structure and deleting the snapshot from the storage structure if there is no snapshot of the second snapshot type that was created after the snapshot had been created in the storage structure.

5. The method of claim 1, wherein each of the snapshot and the another snapshot is associated with a generation number that is increased from a previous generation number for a deletion or creation of any snapshot in the storage structure.

6. The method of claim 5, wherein the storage structure includes at least an archive section, a metadata section and a data section, and wherein generation numbers of snapshots of the storage object are stored in the archive section of the storage structure.

7. The method of claim 1, further comprising:
   in response to a request to delete the another snapshot of the second snapshot type, deleting the another snapshot from the storage structure; and
   when the snapshot that was previously delete designated without being deleted still exists in the storage structure, deleting the snapshot from the storage structure in response to the deletion of the another snapshot from the storage structure.

8. The method of claim 1, wherein the storage object is a namespace object of a virtual machine or a virtual disk object of the virtual machine and the snapshot is a snapshot of the namespace object or the virtual disk object.

9. A computer-readable storage medium containing program instructions for managing different types of snapshots of storage objects stored in a storage system, wherein execution of the program instructions by one or more processors of a computer system causes the one or more processors to perform steps comprising:
   receiving a request to delete a snapshot of a storage object, wherein the snapshot and the storage object are included in a storage structure in the storage system;
   determining whether the snapshot is a first snapshot type or a second snapshot type, wherein a snapshot of the first snapshot type is a snapshot that is created in response to a user request and wherein a snapshot of the second snapshot type is a snapshot that is automatically created; and
   when the snapshot is determined to be the second snapshot type, deleting the snapshot from the storage structure, and when the snapshot is determined to be the first snapshot type, marking the snapshot as delete designated without deleting the snapshot from the storage structure only if there is another snapshot of the second snapshot type in the storage structure and the another snapshot was created after the snapshot had been created in the storage structure, thereby the snapshot being available when the second snapshot type snapshot is subsequently used.

10. The computer-readable storage medium of claim 9, wherein the first snapshot type is a type of snapshot created by a virtualization software supporting a virtual computing instance and wherein the second snapshot type snapshot is a snapshot created by a data protection module for recovery of the storage object.

11. The computer-readable storage medium of claim 9, wherein the storage object and the snapshot are both stored in the storage structure using a B+ tree structure.

12. The computer-readable storage medium of claim 9, wherein the steps further comprise, when the snapshot is determined to be the first snapshot type, marking the snapshot as delete designated, recording a deletion of the snapshot as an entry in the storage structure and deleting the snapshot from the storage structure if there is no snapshot of the second snapshot type that was created after the snapshot had been created in the storage structure.

13. The computer-readable storage medium of claim 9, wherein each of the snapshot and the another snapshot is associated with a generation number that is increased from a previous generation number for a deletion or creation of any snapshot in the storage structure.

14. The computer-readable storage medium of claim 13, wherein the storage structure includes at least an archive section, a metadata section and a data section, and wherein generation numbers of snapshots of the storage object are stored in the archive section of the storage structure.

15. The computer-readable storage medium of claim 9, wherein the steps further comprise:
in response to a request to delete the another snapshot of the second snapshot type, deleting the another snapshot from the storage structure; and
when the snapshot that was previously delete designated without being deleted still exists in the storage structure, deleting the snapshot from the storage structure in response to the deletion of the another snapshot from the storage structure.

16. The computer-readable storage medium of claim 9, wherein the storage object is a namespace object of a virtual machine or a virtual disk object of the virtual machine and the snapshot is a snapshot of the namespace object or the virtual disk object.

17. A computer system comprising:
a storage system having computer data storage devices to store at least one storage structure;
memory; and
a processor configured to:
receive a request to delete a snapshot of a storage object, wherein the snapshot and the storage object are included in a storage structure in the storage system;
determine whether the snapshot is a first snapshot type or a second snapshot type, wherein a snapshot of the first snapshot type is a snapshot that is created in response to a user request and wherein a snapshot of the second snapshot type is a snapshot that is automatically created; and
when the snapshot is determined to be the second snapshot type, delete the snapshot from the storage structure, and when the snapshot is determined to be the first snapshot type, mark the snapshot as delete designated without deleting the snapshot from the storage structure only if there is another snapshot of the second snapshot type in the storage structure and the another snapshot was created after the snapshot had been created in the storage structure, thereby the snapshot being available when the second snapshot type snapshot is subsequently used.

18. The computer system of claim 17, wherein the storage object and the snapshot are both stored in the storage structure using a B+ tree structure.

19. The computer system of claim 17, wherein the processor is further configured to, when the snapshot is determined to be the first snapshot type, mark the snapshot as delete designated, record a deletion of the snapshot as an entry in the storage structure and delete the snapshot from the storage structure if there is no snapshot of the second snapshot type that was created after the snapshot had been created in the storage structure.

20. The computer system of claim 17, wherein the processor is further configured to:
in response to a request to delete the another snapshot of the second snapshot type, delete the another snapshot from the storage structure; and
when the snapshot that was previously delete designated without being deleted still exists in the storage structure, delete the snapshot from the storage structure in response to the deletion of the another snapshot from the storage structure.

* * * * *